Nov. 2, 1948.  R. D. WERNER  2,452,884
METHOD AND DEVICE FOR MOLDING
Filed July 7, 1945  2 Sheets-Sheet 1
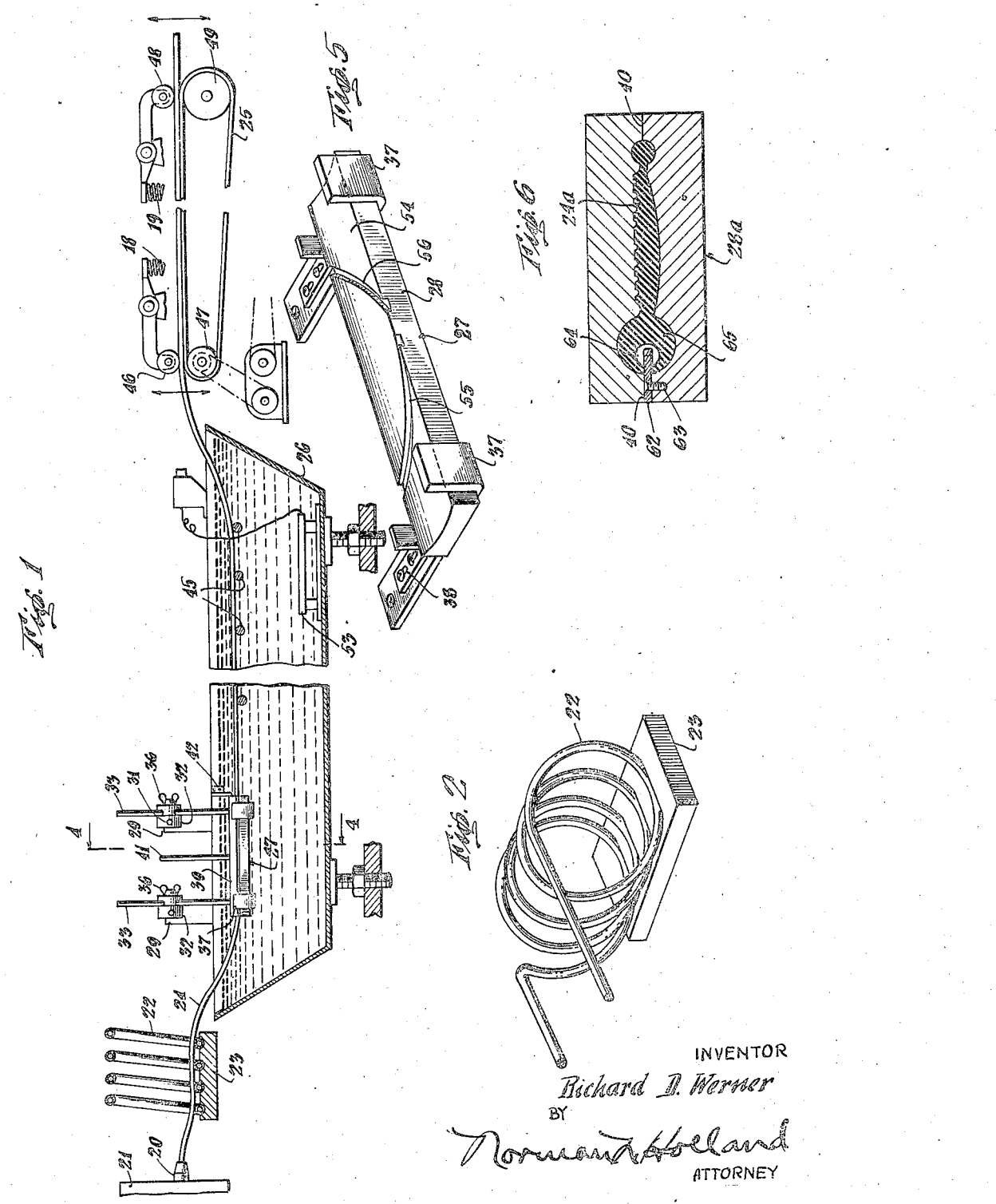
INVENTOR
Richard D. Werner
BY
Norman D. Holland
ATTORNEY

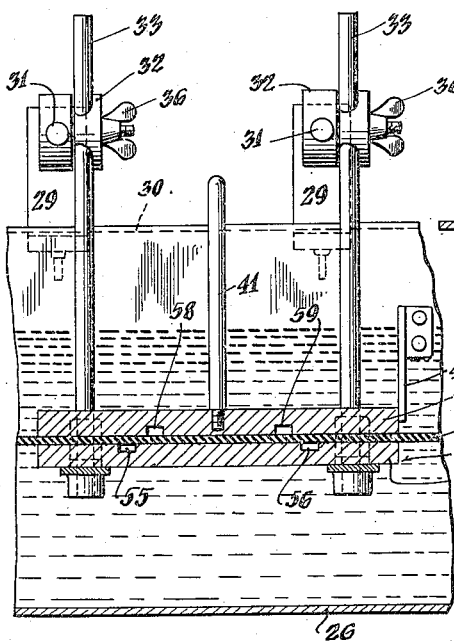
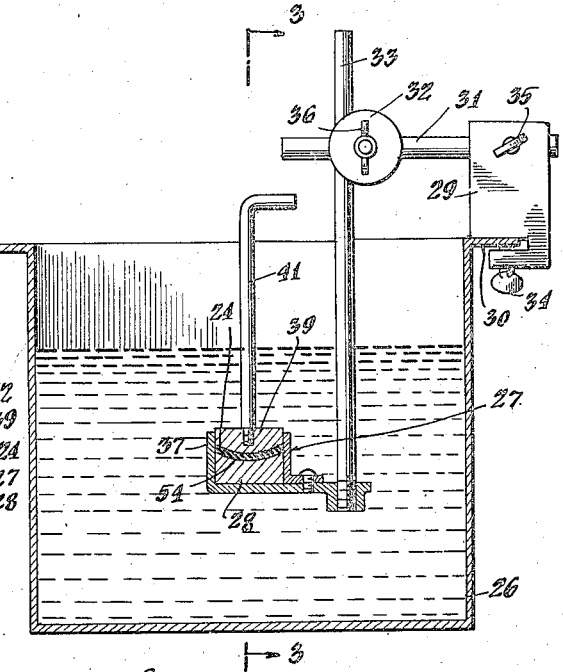
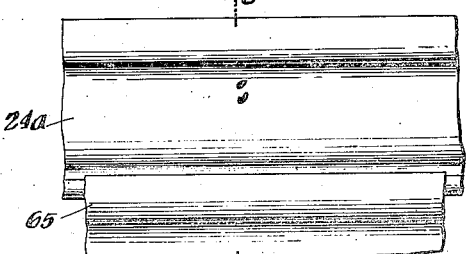
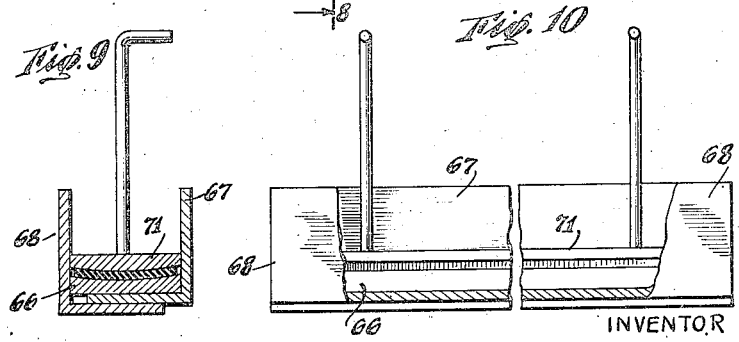

Patented Nov. 2, 1948

2,452,884

UNITED STATES PATENT OFFICE 2,452,884

METHOD AND DEVICE FOR MOLDING

Richard D. Werner, New York, N. Y., assignor to R. D. Werner Co., Inc., New York, N. Y., a corporation of New York Application July 7, 1945, Serial No. 603,697

15 Claims. (Cl. 18—1)

The present invention relates to the art of extruding plastics and more particularly to improvements in methods and devices for cooling and finishing continuous length moldings of thermoplastic materials and other products of a similar nature as they issue from the die of an extruding machine.

In extruding thermoplastics in continuous lengths, a material such as cellulose acetate is heated and forced through dies of the proper shape to give the cross section desired. The material hardens as it cools and can be produced rapidly.

The material leaves the extruding die at some 300° or 400° F., is soft and tends to adhere to contacting surfaces which will mar the smoothness of the finish, one of the most desirable characteristics of plastic products from the standpoint of beauty. The handling and cooling of the material as it leaves the extruding machine plays an important part in the success of the process with all shapes of strips or rods and particularly with strips or rods of irregular cross section.

The present invention aims to provide an improved method and devices for cooling and finishing the continuous length extrusions without marring the smooth surface of the finished strip. In the embodiment shown these results are obtained by guiding an issuing stream of hot thermoplastic material over a bottom-cooling device which cools the bottom so as to stabilize the stream against sagging to a considerable extent, and then guiding the still hot stream through jigs immersed in a suitable liquid medium such as water at a suitable temperature, the temperature varying widely with the plastic and also varying with the shape and size of the product being produced. The bottom cooling device may comprise a metal plate, which may be water-cooled, to stiffen or possibly form a thin skin which lessens sagging, alters internal tensions, and prevents undesirable distortions. The extruded stream may then be submerged in a tank of liquid such as water and drawn through one or more jigs, which may, if desired, reduce the size thereof. After considerable submerged travel, the hardened strip is received by a continuous conveyor which cooperates to draw the strip through the jigs, and delivered for use at the end of the conveyor.

An object of the present invention is to provide improved devices and method for treating continuously molded strips or bars leaving an extruding device.

Another object of the invention is to cool continuously extruded strips and rods without impairing the smooth surface of the finished product.

Another object of the invention is to provide accurate and uniform cross sectional dimensions in the finished product.

Another object of the invention is to facilitate the extrusion of strips of irregular cross section.

Another object of the invention is to control the dimensions of the finished strip by reducing the size thereof after it leaves the extruding die and by accurately controlling the amount of the reduction.

A further object of the invention is to minimize sagging of the extruded strip by cooling the bottom thereof as it leaves the extruding die.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

Fig. 1 is a diagrammatic side view, partly in section, of a preferred embodiment of the invention and one way of practicing the method;

Fig. 2 is a perspective view of a preferred embodiment of supporting and cooling means;

Fig. 3 is an enlarged sectional side view of part of the apparatus of Fig. 1, taken on the line 3—3 of Fig. 4;

Fig. 4 is an enlarged sectional end view on the line 4—4 of Fig. 1;

Fig. 5 is an enlarged perspective view of one embodiment of jig;

Fig. 6 is a cross-sectional view of a jig or drawing die through which a strip of material is being drawn;

Fig. 7 is a front view of the molded product shown in Fig. 6, showing how it may be assembled for making some types of product;

Fig. 8 is a sectional view on the line 8—8 of Fig. 7;

Fig. 9 is a side elevational view of a jig similar to that shown in Fig. 4, but showing an alternate form of mounting; and Fig. 10 is a side view of the jigs or drawing dies shown in Fig. 9.

Referring further to the drawings illustrating a preferred embodiment of the invention and one method of practicing the method, there is shown in Fig. 1 a diagrammatic illustration of the several steps. The continuous strip 24 is extruded from a machine 21 through a die 20 over a cooling element 23 into a tank 26 partially filled with a liquid medium, usually water. A jig is shown immersed in the liquid through which the strip passes and by which it is further shaped and further cooled. Suitable supports 45 support the strip in its passage through the cooling medium after it leaves the jig. A continuous conveyor 25 receives the cooled strip and draws it through the jig and from the extruding die. The speed of the conveyor is variable and is accurately controlled. The greater the speed of the conveyor the greater the reduction in the strip after it leaves the extruding die 20. The several elements and devices referred to above will now be described in more detail without any intention of limiting the invention beyond its true and comprehensive scope in the art.

The extruding machine 21 is shown diagrammatically and may be purchased in the open market. The structural features are not illustrated herein as they are not involved in the present invention which relates more particularly to the treatment of the extruded strip after it leaves the machine rather than to the particular type of machine utilized.

The extruding machine 21 receives a plastic such as cellulose acetate, heats it to a suitable temperature, for example 300° or 400° F. and extrudes it through the die 20. The die 20 is shaped to deliver the proper cross-section of strip and is preferably slightly larger than the desired cross-section of the finished strip so that it may be reduced as described hereinafter.

The strip 24 as it leaves the extruding die passes over the cooling element 23 prior to entering the liquid in the tank 26. The preferred embodiment of the cooling element is shown more particularly in Figs. 1 and 2 and may comprise a metal base of copper or the like with a coil 22 made of tubular material embedded in the upper surface thereof. Preferably the upper half of the tubular parts embedded in the base member protrude above the surface of the base member so that the strip 24 contacts the spaced coils, as shown more particularly in Fig. 1. Water is passed through the coil so that it may be retained at any suitable temperature, depending upon the results desired and upon the cross-sectional dimension of the strip. Preferably the tube is made of copper and likewise the base for it but other materials may be utilized if desired. It will be understood that any suitable cooling means may be utilized for this purpose. In the preferred embodiment, the cooling means engages and supports the strip intermediate the tank 26 and the extruding die 20.

The cooling element at this point serves a twofold function. First, it supports the strip as it leaves the extruding die and prevents undue sagging and distortion of it. Secondly, it forms a hardened skin on the under surface which strengthens this portion of the strip and minimizes sagging in its further passage through the cooling elements. The cooling element 23 minimizes distortion and internal stresses and strains in the material.

As the strip leaves the cooling element, it enters the water in the tank 26 and also enters the jig 27. While various forms of jigs or dies may be utilized, one embodiment is illustrated in Figs. 1, 3, 4, and 5. This particular jig is primarily designed for forming a strip of material somewhat curved in section, as illustrated more particularly in Figs. 4 and 9. With other shapes of strips or rods, different shapes of jig members are desirable. Certain features are preferably common to all of them.

Referring more particularly to Figs. 1, 3, 4 and 5, the jig may comprise a lower base member 28 supported in a pair of brackets 37 having an adjustable attachment 38 thereon for suitable adjustment to accommodate different sizes of jigs. The member 37 may be supported by a suitable bracket 29 secured to the flage 30 of the tank 26. The bracket 29 is held in position by a suitable set screw 34 and has a rod 31 projecting horizontally therefrom, which is likewise adjustable in length by a suitable set screw or wing nut 35. A member 32 is mounted on the rod 31 and holds a vertical rod 33 in position by a wing nut 36. The vertical rod 33 extends down into the water and is threaded to the bracket 37. In this way the jig 27 is adjustably supported longitudinally, laterally and vertically in the tank 26. The depth of immersion can be adjusted quickly and other adjustments made with respect to the tank 26.

The jig illustrated in Figs. 1, 3, 4 and 5 comprises a base member 28 having a smooth upper surface somewhat concave as shown at 54 and has a pair of channels 55 and 56 extending over the upper surface thereof. These channels project through the edges so that liquid can enter and pass beneath the material moving over the surface as shown more particularly in Fig. 3. An upper member 39 rests on the material passing through the jig is shown more particularly in Figs. 3 and 4. The upper member may have a handle 41 which facilitates lifting the member when desired. The top element 39 is likewise held in position longitudinally by a stop member 42.

While the stop member is shown as a bracket attached to the side of the tank, it may be of any form desired and preferably is a stop member similar to the supporting bracket described above and adjustable laterally, vertically and longitudinally of the tank as described with reference to the bracket 29 and its associated parts. The top member which ordinarily has no pressure applied to it other than its own weight, although it may be weighted if desired, has in its under surface, engaging the strip of material, channels 58 and 59 corresponding to the channels 55 and 56 on the base member. Preferably these channels cross the channels in the base 28 rather than parallel them. The liquid in the tank may flow freely through these channels and the movement of the material tends to cause a flow of water through the channels. In addition, the material tends to carry from the channels a film of liquid over the contacting surfaces of the jig. In this way, the opposite side of the strip of material is exposed to a film of constantly changing liquid which not only accelerates the cooling of the surface of the strip but also forms a lubricant which minimizes the disturbance of the surface and marring of the finish of the material.

Preferably the members 28 and 39 are made of stainless steel to further insure smoothness of surface and to avoid any marring of the surface of the material in passage through the jigs. While it has been found that for short runs bronze or brass may be utilized or chromium-plated materials, the water and dilute acid resulting from the material passing through the water tends to form oxides on these surfaces which create undue friction after short runs. These less desirable materials may be used for short runs and of course could be used for long runs, but they are not as desirable in either case. The stainless steel jig surfaces are a feature of the invention as it has a much longer life, requires less attention in operation, and produces a better finish.

After the strip 24 leaves the jig, it passes over a series of supports 45 to prevent undue sagging in passing through the remainder of the tank. These supports may likewise be mounted on brackets similar to the bracket 29 with adjustable horizontal rods 31 and vertical rods 33. The strip as it leaves the tank is received by a continuous conveyor 25 mounted on pulleys 47 and 49. Preferably the conveyor 25 is positively driven by a suitable motor or other drive, the speed of which may be varied within reasonable limits. An idler 46 is mounted over the pulley 47 and presses the strip of material firmly against it so that the strip is drawn from the tank 26, from the jig 27 and from the extruding die 20. The surface of the idler 46 may be shaped to conform to the shape of the strip if desired although this is not ordinarily required. The roller may be resiliently held down in any suitable manner, for example by a spring 18. The opposite end preferably has a similar idler 48 suitably mounted on a pivoted bracket and held in position by a spring 19.

Preferably the speed of the conveyor is adjusted so that the strip is drawn at a speed slightly greater than the extrusion speed from the die 20. In this way the strip is increased in length and decreased in cross-section an amount depending upon the difference in the speed of the conveyor and the speed of the material at the extruding die.

The tank 26 is preferably mounted on supports which are adjustable vertically to vary the height therein and likewise the conveyor 25 is mounted on supports which are adjustable vertically so that the parts may be positioned for best operation.

The temperature of the water or other liquid in the tank 26 depends upon the cross-section of the strip and the speed of extrusion. In some cases a temperature of 200° F. may be desired and a suitable heater such as the electric heater 53 may be utilized to maintain the temperature. In other cases relatively cold water is desired and may be maintained by adding additional tap water.

In certain instances it is desirable instead of having a single jig as shown more particularly in Figs. 1, 3, 4 and 5 to have a plurality of jigs as shown more particularly in Figs. 9 and 10. In the latter construction a pair of L-shaped members 67 and 68 may be superimposed as shown in Fig. 9 to receive a bottom member 66 corresponding to the bottom member 28 in Fig. 5 and a top member 71 corresponding to the top member 39 in Fig. 4. These members may be held in position by a stop like 42, not shown. In certain instances better results are obtained by two or more jigs which are preferably similar in design.

As illustrative of the different shapes and cross-sections which may be made, a jig is shown in Fig. 6 for making a strip having a bead 65 with a channel 64 therein. The lower jig member 28a may have secured to it a metal strip 62, secured to it by a screw 63 which enters the channel 64 and holds it open during the passage through the jig. In this case the edges of the jig members may rest on each other or be slightly spaced from each other. Usually the faces 40 are spaced slightly and the weight of the upper member rests upon the strip. While the grooves or channels 55 and 56 in the lower member and the grooves 58 and 59 in the upper member do not show in the section, they preferably are embodied in the surfaces for the reasons explained hereinbefore. The strips illustrated as formed by the jig in Fig. 6 are shown assembled in a series in Fig. 8 and designated 24a. A side elevation of these strips is shown in Fig. 7. This is illustrative of one use of this type of strip which lends itself to the manufacture of articles such as handbags and the like where flexibility is required. Other shapes and constructions may be utilized in the manufacture of toys, toy furniture, etc.

In the operation of the device and in practicing the method, the strip of material 24 is extruded from a die 20 in substantially the section desired but preferably slightly larger in dimensions than the desired dimensions of the finished product. The strip passes over the cooling element 23 which prevents sagging and cools the lower surface thereof before passage into the tank 26 where the strip is submerged in liquid and passes through a suitable jig which applies a limited pressure to it. The strip is drawn through the jig and through the tank by a continuous conveyor 25. The conveyor operates at a slightly greater speed than the speed of the material passing through the die. This increased speed pulls the strip, reduces the cross-section of the material slightly and draws it through the jig where the surface is further cooled and smoothed by the smooth metal surface and the film of liquid between these surfaces and the strip. The grooves in the surfaces of the jig cause a free flow of liquid over the surfaces thereby facilitating the cooling and minimizing friction between the parts.

It will be seen that the invention provides a simple and effective means for cooling and shaping extruded strips without marring the surface and beauty of the finished product. The strip is reduced slightly in size in the cooling operation, which increases the production of the extrusion machine and at the same time forms a better product. The temperature of the water or other liquid may be regulated as desired by a suitable heater in the tank or may be cooled by the addition of cold water so that the required difference in temperature to produce optimum results may be readily achieved.

As various changes may be made in the form, construction and arrangement of the parts herein without departing from the spirit and scope of the invention and without sacrificing any of its advantages, it is to be understood that all matter herein is to be interpreted as illustrative and not in a limiting sense. Having thus described my invention, I claim:

1. A molding device adapted to receive material from a hot extrusion die, comprising the combination of a cooled coil supporting the extruded material, a tank for liquid into which the extruded material passes from the coil to be cooled in the tank, and a jig in the tank adapted to be submerged by the liquid through which the extruded material is drawn.

2. A molding device adapted to receive material from a hot extrusion die, comprising the combination of a cooled coil supporting the extruded material, a tank for liquid into which the extruded material passes from the coil to be cooled in the tank, and a jig in the tank adapted to be submerged by the liquid and having a groove in the surface thereof adapted to lie in the liquid so that the extruded material is drawn across the groove and contacts the liquid in the groove.

3. A molding device adapted to receive material from a hot extrusion die, comprising the combination of an artificially cooled support spaced from the extrusion die and having a supporting surface conforming at least partly to the under-side shape of the extruded material and adapted to hold the extruded material against sagging, a reservoir for liquid into which the extruded material passes from said extrusion die and from said cooled support to be cooled, and material-forming means in the reservoir normally submerged by the liquid and through which material-forming means the extruded material is drawn.

4. A molding device adapted to receive material from a hot extrusion die, comprising the combination of an artificially cooled support having a supporting surface conforming at least partly to the under-side shape of the extruded material and adapted to hold the extruded material against sagging, a tank into which the extruded material passes so as to be cooled by liquid in the tank, a driven means beyond the tank adapted to hold and draw the material, and material-forming means in the tank normally submerged by the liquid and through which material-forming means the extruded material is drawn by said driven means.

5. A molding device adapted to receive material from a hot extrusion die for extruding a stream of hot material, comprising the combination of an artificially cooled support adapted to hold the extruded material against sagging, a tank into which the extruded material passes so as to be cooled by liquid in the tank, a driven belt beyond the tank adapted to hold material and draw the material from the tank, material-forming members positioned in the tank to be submerged in the liquid and between which material-forming members the extruded material is drawn, and material-supporting means in the tank below the level at which tank liquid will stand and intermediate the material-forming members and the driven belt.

6. A molding device adapted to receive material from a hot extrusion die comprising the combination of an artificially cooled support adapted to hold the extruded material against sagging, a tank into which the extruded material passes to be cooled by liquid in the tank, and means positioned in the tank to be submerged in the liquid and through which means the extruded material is drawn, said means including a bottom member held fixed and an upper member supported by the material passing under it.

7. A molding device adapted to receive material from a hot extrusion die comprising the combination of a tank adapted to hold liquid to submerge the issuing hot material, a supporting die positioned in the tank below the liquid level thereof and over which the material is moved, a separate top shaping die effective upon the top of the material, supports for the material before the dies and beyond the dies, and a separate cooling device for the bottom of the material forming part of the support before the dies.

8. A molding device adapted to receive material from a hot extrusion die, comprising the combination of a tank adapted to hold liquid to submerge the issuing hot material, a stainless steel jig submerged in the liquid in the tank and through which jig and liquid the material is drawn, and a bottom cooling device over which the hot material passes to cool its bottom preliminary to passing through the jigs.

9. A molding device adapted to receive material from a hot extrusion die, comprising the combination of a tank adapted to hold liquid to submerge the issuing hot material, stainless steel dies within the tank submerged in the liquid and through which the stream of material is drawn to shape it, a bottom cooling device over which the hot material passes to cool its bottom preliminary to molding in the dies, and spaced supports holding the material while submerged a substantial distance after leaving the dies.

10. A molding device adapted to receive material from a hot extrusion die, comprising the combination of, a tank adapted to hold liquid to submerge the issuing hot material, a bottom member in the tank below the liquid level thereof engaging and shaping a bottom portion of the issuing material, a top member engaging and shaping a top portion of the issuing material and urging the material toward said bottom member, and a metal cooling surface over which the material slides to cool its bottom before entering the tank.

11. A molding device adapted to receive material from a hot extrusion die, comprising the combination of, a tank adapted to hold liquid to submerge the issuing hot material, a bottom die in the tank below the liquid level thereof engaging and shaping a bottom portion of the issuing material, a top die engaging and shaping a top portion of the issuing material and serving to urge the material toward said bottom die, a metal cooling surface over which the stream of material slides to cool its bottom before entering the tank, spaced supports holding the material while submerged a substantial distance after leaving the dies, and a continuous conveyor beyond the tank drawing on the material.

12. The process of making thermoplastic products which comprises sliding an extruded stream of the hot material across a cooling metal plate, carrying the stream through a submerged die, to water cool it, and pulling the cooled stream to reduce its size as it goes through the die.

13. The process of making thermoplastic products which comprises cooling one side of a stream of the hot material, carrying this stream through a body of liquid and a submerged die, carrying the stream further through the liquid, and removing it from the liquid.

14. The process of forming a thermoplastic product which comprises sliding an extruded stream of the hot material across a cooling plate to cool one side of it, carrying the stream through a body of liquid to cool all sides of it, carrying the still submerged stream through a submerged die which reduces to size by pulling it, and removing the formed stream from the liquid.

15. The process of forming a thermoplastic product which comprises sliding an extruded stream of the hot material across a cooling plate to cool its bottom, pulling the stream through cooling water and through a submerged water-lubricated die which reduces its size and through more water, and then removing the formed stream from the liquid.

RICHARD D. WERNER.

REFERENCES CITED

The following references are of record in the file of this patent:

UNITED STATES PATENTS

| Number | Name | Date |
|---|---|---|
| 1,740,029 | Moomy | Dec. 17, 1929 |
| 1,952,038 | Fischer | Mar. 20, 1934 |
| 2,070,525 | Eberhard | Feb. 9, 1937 |
| 2,125,001 | Cowen et al. | July 26, 1938 |
| 2,126,869 | Burchenal et al. | Aug. 16, 1938 |
| 2,194,313 | Loomis | Mar. 19, 1940 |
| 2,294,555 | Hendrie | Sept. 1, 1942 |
| 2,375,827 | Slaughter | May 15, 1945 |
| 2,384,521 | Andersen et al. | Sept. 11, 1945 |